UNITED STATES PATENT OFFICE.

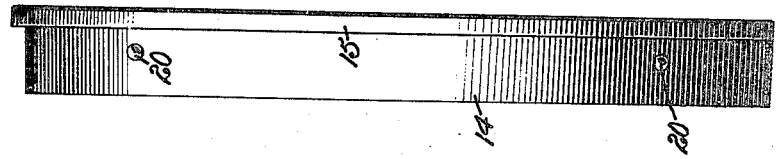
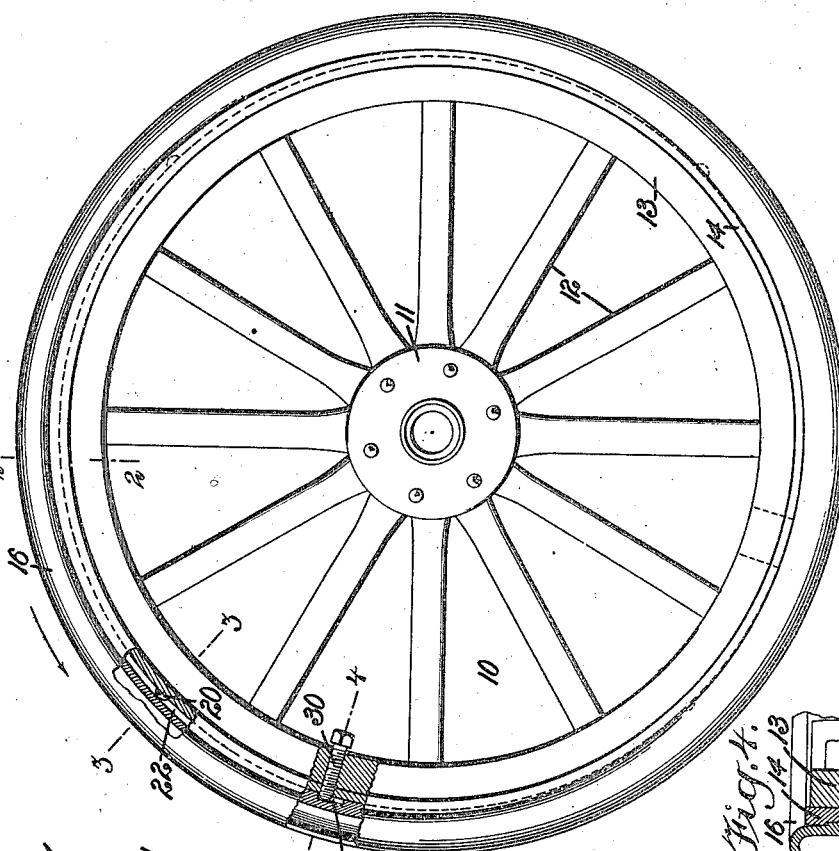
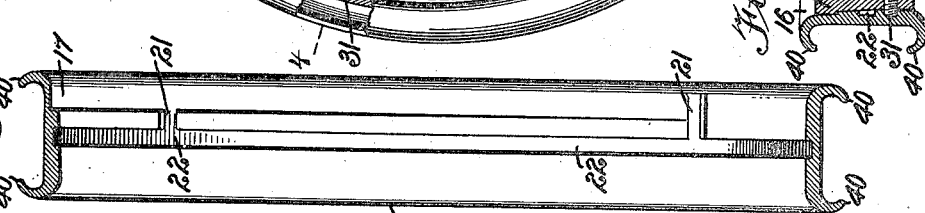
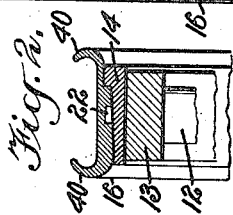
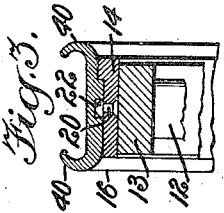

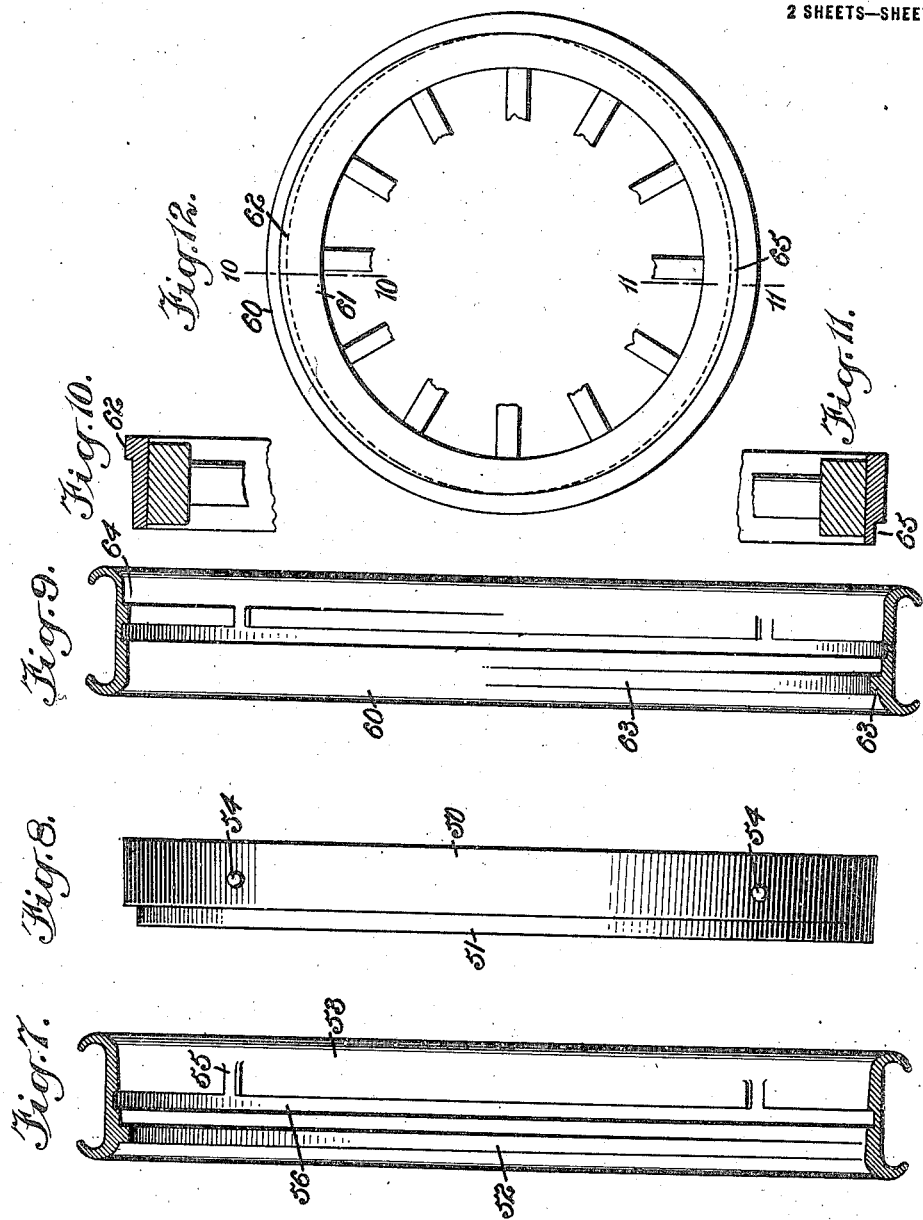

GABRIEL P. B. HOYT, OF NEW YORK, N. Y.

WHEEL.

1,228,557.   Specification of Letters Patent.   Patented June 5, 1917.

Application filed June 20, 1916. Serial No. 104,749.

*To all whom it may concern:*

Be it known that I, GABRIEL P. B. HOYT, a citizen of the United States, and a resident of the city of New York, Jamaica, borough of Queens, in the county of Queens and State of New York, have invented a new and Improved Wheel, of which the following is a full, clear, and exact description.

The object of the invention is to provide a new and improved wheel of the detachable rim type, and arranged to permit conveniently placing the rim in position on the wheel, to securely lock it in place thereon, and to allow of quickly removing the rim from the wheel for repairs or for replacement by another whenever it is desired to do so.

In order to accomplish the desired result, use is made of a rim adapted to be moved axially relatively to the wheel body to place the rim in position on the wheel body or to remove it therefrom, the said body and rim having circumferential or peripheral eccentric frictional locking means adapted to lock the rim in position on the wheel body on turning the wheel body and rim one relatively to the other in the plane of the rotation of the wheel. Use is also made of retaining means on the wheel body and rim to hold the rim from separating in an axial direction from the wheel body at the time the wheel body and rim are in frictional locking position. Use is further made of fastening means on the wheel body and rim to limit the turning movement one relatively to the other at the time the wheel body and rim are in frictional locking position.

A practical embodiment of the invention is represented in the accompanying drawings forming a part of this specification, in which similar characters of reference indicate corresponding parts in all the views.

Figure 1 is a face view of the wheel with the parts in section;

Fig. 2 is a transverse section of the same on the line 2—2 of Fig. 1;

Fig. 3 is a similar view of the same on the line 3—3 of Fig. 1;

Fig. 4 is a similar view of the same on the line 4—4 of Fig. 1;

Fig. 5 is a cross section of the rim;

Fig. 6 is an edge view of the wheel body;

Fig. 7 is a cross section of a modified form of the rim;

Fig. 8 is an edge view of the wheel body for receiving the rim shown in Fig. 7;

Fig. 9 is a cross section of another modified form of the rim;

Figs. 10 and 11 are cross sections of the wheel body for the reception of the rim shown in Fig. 9; and Fig. 12 is a reduced face view of part of the wheel having the rim shown in Fig. 9.

The wheel body 10 is provided with the usual hub 11 from which spokes 12 connect with the felly 13 provided with a felly band 14 having a peripheral or circumferential eccentric rib or tongue 15 preferably located at one side thereof, as plainly indicated in Figs. 1, 2, 3, 4 and 6. The peripheral face of the felly band 14 is slightly beveled and on it fits a single piece rim 16 provided on its inner face with a circumferential eccentric rabbet 17 into which fits the rib or tongue 15 at the time the centers of the rib 15 and the rabbet 17 coincide. The outer faces of the wheel are preferably provided with positioning marks to indicate the concentric position of the tongue or rib 15 and the rabbet 17 to permit of conveniently placing the rim 16 in position on the wheel body or removing it therefrom. After the wheel rim has been placed in position on the wheel body the rim and the wheel body are turned one relatively to the other in the plane of the rotation of the wheel so that the peripheral face of the rib 15 moves in frictional locking position against the peripheral wall of the rabbet 17 to securely fasten the rim in position on the wheel body. When it is desired to remove the rim from the wheel body it is necessary to turn the rim on the body to neutral position, that is, until the axes of the rib 15 and the rabbet 17 coincide. The rim can then be readily slipped off axially from the wheel body.

In order to prevent any possible disconnection of the rim from the wheel body in a transverse or axial direction use is made of lugs 20 arranged on the peripheral face of the felly band 14 and adapted to pass through slots 21 into an annular groove 22 formed in the inner face of the rim 16, as plainly indicated in Fig. 5. It is understood that the lugs 20 are in register with the slots 21 at the time the rim and the wheel body are in neutral position, as above described, and when the rim is turned on the wheel body then the lugs 20 move out of register with the slots 21 and are confined between the side walls of the groove 22.

After the rim 16 has been turned, on the wheel body 10, into frictional locking position, as above described, then the rim is fastened in place against return turning movement by the use of a set screw 30 screwing in the felly 13 and its band 14 to engage a short recess 31 formed in the inner face of the rim 16. It is understood that the set screw 30 is retracted prior to returning the rim 16 to neutral position whenever it is desired to remove the rim from the wheel body. The rim 16 is provided with the usual retaining flanges 40 for engagement by the beads of the shoe containing an inner tube, if such tire construction is used.

Instead of having the rib 15 on the wheel body and the rabbet 17 on the rim 16, the arrangement may be reversed, as indicated in Figs. 7 and 8, in which the felly band 50 is provided with a circumferential eccentric rabbet 51 adapted to be engaged by an eccentric rib 52 formed on the inner face of the rim 53. Otherwise the construction is practically the same as above described relatively to the wheel shown in Figs. 1 to 6, that is, the felly band 50 is provided with lugs 54 adapted to pass through slots 55 into an annular groove 56 formed in the inner face of the rim 53 to hold the rim against axial displacement on the wheel body.

In the modified form shown in Figs. 9 and 10, the frictional locking means for fastening the rim 60 on the wheel body 61 consists of two eccentric ribs 62 and 63, of which the rib 62 is on the peripheral face of the wheel body and the rib 63 is on the inner face of the rim 60, but the ribs are located on opposite sides of the wheel. The rib 62 is adapted to be seated in a rabbet 64 formed on the inner face of the rim 60, and the rib 63 is adapted to be seated on a rabbet 65 formed on the wheel body 61. In this case the ribs 62 and 63 extend approximately around one half the circumference of the respective parts and are located diametrically opposite each other, as will be readily understood by reference to Figs. 9 and 10. The transverse locking means and the retaining means above described are also present in this construction so that further description of the same is not deemed necessary.

From the foregoing it will be seen that by the arrangement described the rim can be readily placed in position on the wheel body and securely locked thereon and the rim can be quickly removed from the wheel body, whenever it is desired to do so, for repairs or for replacement by another rim.

The construction shown and described is very simple and few parts are involved which are not liable to get out of order easily.

Having thus described my invention, I claim as new and desire to secure by Letters Patent:—

1. In a wheel, the combination of a wheel body, a rim adapted to be moved axially relatively to the wheel body to place the rim concentrically in position on the wheel or to remove it therefrom, and said body and rim having eccentric peripheral frictional locking means adapted to lock the rim in concentric position on the wheel body on turning the wheel body and rim one relatively to the other in the plane of the rotation of the wheel.

2. In a wheel, the combination of a wheel body, a single piece rim adapted to be moved axially relatively to the wheel body to place the rim into concentric position on the wheel body or remove it therefrom, the said wheel body and rim having eccentric interlocking means disposed peripherally on the contacting faces of the wheel body and rim and adapted to interlock on turning the wheel body and rim one relatively to the other in the plane of the rotation of the wheel.

3. In a wheel, the combination of a wheel body, a single piece rim, the said body and rim when in one position being adapted to be moved axially one relative to the other to place the rim in concentric position on the wheel body or to remove it therefrom, and eccentric interlocking means on the contacting peripheral concentric faces of the wheel body and rim adapted to move in register with each other on the wheel body and rim assuming the said engaging or removing position, the said eccentric interlocking means moving into or out of frictional locking position on turning the wheel body and rim one relatively to the other in the plane of the rotation of the wheel.

4. In a wheel, the combination of a wheel body, a rim adapted to fit concentrically on the said wheel body, and a peripheral eccentric on one of the said parts engaging an eccentric rabbet on the other part.

5. In a wheel, the combination of a wheel body, a one piece rim adapted to be moved axially relatively to the said wheel body to place the rim in concentric position on the wheel body or remove it therefrom, and frictional locking means for fastening the rim in place on the wheel body, the said frictional locking means comprising an eccentric rib engaging an eccentric rabbet, one being on the peripheral face of the wheel body and the other being on the inner face of the rim, the said eccentric rib and rabbet moving into or out of locking position on turning the wheel body and rim one relatively to the other in the plane of rotation of the wheel.

6. In a wheel, the combination of a wheel body, a single piece rim, the said body and rim in one position being adapted to be moved axially one relatively to the other to place the rim in concentric position on the wheel body or to remove it therefrom, interlocking means arranged eccentrically on the contacting peripheral faces of the wheel body and rim and adapted to move in register with each other on the wheel body and rim assuming the said engaging or removing position, the said eccentric interlocking means moving into or out of frictional locking position on turning the wheel body and rim one relatively to the other in the plane of rotation of the wheel, and retaining means on the said wheel body and rim to hold the rim from separating in an axial direction from the wheel body at the time the wheel body and rim are in frictional locking position.

7. In a wheel, the combination of a wheel body, a single piece rim, the said body and rim when in one position being adapted to be moved axially one relatively to the other to place the rim in concentric position on the wheel body or to remove it therefrom, interlocking means arranged eccentrically on the contacting peripheral faces of the wheel body and rim and adapted to move in register with each other on the wheel body and rim assuming the said engaging or removing position, the said eccentric interlocking means moving into or out of frictional locking position on turning the wheel body and rim one relatively to the other in the plane of rotation of the wheel, and fastening means on the said wheel body and rim to limit the turning movement one on the other at the time the wheel body and rim are in frictional locking position.

8. In a wheel, the combination of a wheel body, a single piece rim, the said body and rim when in one position being adapted to be moved axially one relatively to the other to place the rim in concentric position on the wheel body or to remove it therefrom, interlocking means arranged eccentrically on the contacting peripheral faces of the wheel body and rim and adapted to move in register with each other on the wheel body and rim assuming the said engaging or removing position, the said eccentric interlocking means moving into or out of frictional locking position on turning the wheel body and rim one relatively to the other in the plane of rotation of the wheel, the said rim having a short groove on its inner face, and a set screw screwing in the said wheel body and engaging the said rim groove to hold the latter against turning at the time the wheel body and rim are in frictional locking position.

9. In a wheel, the combination of a wheel body, a single piece rim, the said body and rim when in one position being adapted to be moved axially one relatively to the other to place the rim in concentric position on the wheel body or to remove it therefrom, and interlocking means arranged eccentrically on the contacting peripheral faces of the wheel body and rim and adapted to move in register with each other on the wheel body and rim assuming the said engaging or removing position, the said eccentric interlocking means moving into or out of frictional locking position on turning the wheel body and rim one relatively to the other in the plane of rotation of the wheel, the said rim having at its inner face an annular groove from which lead sidewise extending branch slots and the said wheel body having on its peripheral face projections adapted to pass through the said branch slots into the said annular groove.

GABRIEL P. B. HOYT.